(12) United States Patent
Wang et al.

(10) Patent No.: US 11,481,276 B2
(45) Date of Patent: Oct. 25, 2022

(54) BACKUP AGENT SCALING WITH EVALUATION OF PRIOR BACKUP JOBS

(71) Applicant: EMC IP Holding Company LLC, Hopkinton, MA (US)

(72) Inventors: Wei Wang, Chengdu (CN); Mark Malamut, Aliso Viejo, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 343 days.

(21) Appl. No.: 16/790,513

(22) Filed: Feb. 13, 2020

(65) Prior Publication Data

US 2021/0255926 A1 Aug. 19, 2021

(51) Int. Cl.
*G06F 7/00* (2006.01)
*G06F 11/14* (2006.01)
*G06N 5/04* (2006.01)
*G06N 20/00* (2019.01)

(52) U.S. Cl.
CPC .......... *G06F 11/1402* (2013.01); *G06N 5/04* (2013.01); *G06N 20/00* (2019.01); *G06F 2201/80* (2013.01)

(58) Field of Classification Search
CPC . G06F 11/1402; G06F 2201/80; G06N 20/00; G06N 5/04
USPC .......................................... 707/600–899, 640
See application file for complete search history.

(56) References Cited

U.S. PATENT DOCUMENTS

2019/0278661 A1* 9/2019 Mehta ..................... G06F 3/061

* cited by examiner

*Primary Examiner* — Isaac M Woo
(74) *Attorney, Agent, or Firm* — Womble Bond Dickinson (US) LLP

(57) ABSTRACT

A number of backup agents to be deployed to a system can be predicted by training one or more machine learning (ML) objects of a first prediction algorithm and training one or more ML objects of a second prediction algorithm. The training can be performed with archived backup job data. Both prediction algorithms can be applied to the backup job data to predict execution duration of the backup jobs. The prediction algorithm with a lower error can be used to predict a total execution duration of a current number of backup jobs. An optimal number of backup agents can be predicted based on the predicted total execution duration and the current number of backup jobs.

20 Claims, 9 Drawing Sheets

BACKUP AGENT SCALING WITH EVALUATION OF PRIOR BACKUP JOBS

FIELD OF THE INVENTION

Embodiments of the present invention relate generally to data storage systems. More particularly, embodiments of the invention relate to backup agent scaling with evaluation of prior backup jobs.

BACKGROUND

Client servers can exist in the form of file servers, virtual machines on a host, etc. Data on client servers (also simply known as 'clients' or 'hosts') can be lost due to different reasons such as, for example, data corruption, inadvertent deletion, or malicious cyber-attacks. To preserve and protect the data, the data is copied to backup memory, this backup memory being managed by a backup server. Such backup infrastructure is implemented in modern data protection products.

Backup agent scalability is a requisite feature in modern data protection products. A backup agent (also known as backup proxy) performs backup and restore operations to store copies of data (assets) of client machine. Operations include retrieving data from production storage and transporting data to backup storage memory. Backup agents consume resources, thus it is important to deploy enough backup agents to perform backups according to expectations, but not too many so that the agents needlessly consume resources. Backup agents are software modules that can be deployed (e.g., installed) in each client. In some cases, a client can operate multiple assets such as virtual machines (VMs) and/or other assets (databases, etc.). Multiple backup agents can be deployed in a client.

A key factor to trigger scalability is the number of required agents at specific time slot. If backup tasks require a greater number of agents than the actual number of agents deployed to a client, then more backup agents should be scaled-out to that client. Similarly, if backup tasks require less than the number of agents deployed, the backup agents should be scale-in.

Existing backup systems utilize different known techniques (for example, Kubernetes, also known as 'k8s') to manage the deployment of backup agents. Some auto scaling solutions use a jobs queue length and approximate number of jobs processed per agent within a given time slot to determine a scale coefficient value. These solutions then scale out or in backup agents, based on the coefficient value. These solutions, however, have some disadvantages, when applied to a data protection system.

For example, one of the key measurements for a data protection system is recovery point objective (RPO). An RPO describes a time in the past in which a system can recover. Typically, so long as a backup could be taken within that defined time period, this result is acceptable from customer point of view. This means that execution of backup jobs can be delayed so long as the backup jobs can be finished within the time period. Due to a queue size being an instant value, if a backup system's instantaneous throughput is directly used as a key factor for scaling backup agents, then frequency of scaling operation will be high. As a result, such kinds of scaling mechanism are not suitable for user scenarios in data protection system.

Further, the cost for scaling operations in a data protection system is large. For example, scaling a virtual machine backup agent or proxy in some backup systems (e.g., Dell Avamar) can take approximately 8 minutes. As the frequency of the scaling operation increases, the system need allocate additional resources where resources already tend to be scarce.

Existing solutions may allow a user to configure parameters such as, for example, approximate number of jobs that are processed per agent within a specified time interval, and agent offset value. The agent offset value can be used by the system to automatically scale in or scale out the number of agents. Such parameters, however, need to be configured in advanced, based on the user's experience. These magic numbers are generally difficult to define, and rely on too many factors such as the CPU speed and architecture, memory, disk IO, IO throughput, resource handlers, network latency, backup data size, backup asset type distribution, and more. If the magic number of approximate number of jobs per agent within time interval is defined too low, then unnecessary scaling will result. On the contrary, if the value is defined too high, then some of the backup jobs will be missed within the backup window. A predefined magic number applied to system does not account for variations in an environment that occur during runtime. If the magic number is not accurately defined, backup system resource would be wasted, or customer backup requirement could not be fulfilled.

Further, in most solutions, only one algorithm or model is provided to determine agent scaling. Such a solution may not be sufficiently flexible to adapt to different user scenarios. For example, in some customer environments, assets and policy definition are relative static. In another customer environment, however, the assets and policy definition can be dynamic, especially when dynamic policy implemented.

Virtualization further increases a need for accurate deployment of backup agents. Organizations are increasingly deploying applications on VMs to improve Information Technology (IT) efficiency and application availability. A key benefit of adopting virtual machines is that they can be hosted on a smaller number of physical servers (VM servers). Different types of VM backup and recovery options exist.

BRIEF DESCRIPTION OF THE DRAWINGS

Embodiments of the invention are illustrated byway of example and not limitation in the figures of the accompanying drawings in which like references indicate similar elements.

DETAILED DESCRIPTION

Figure 1:
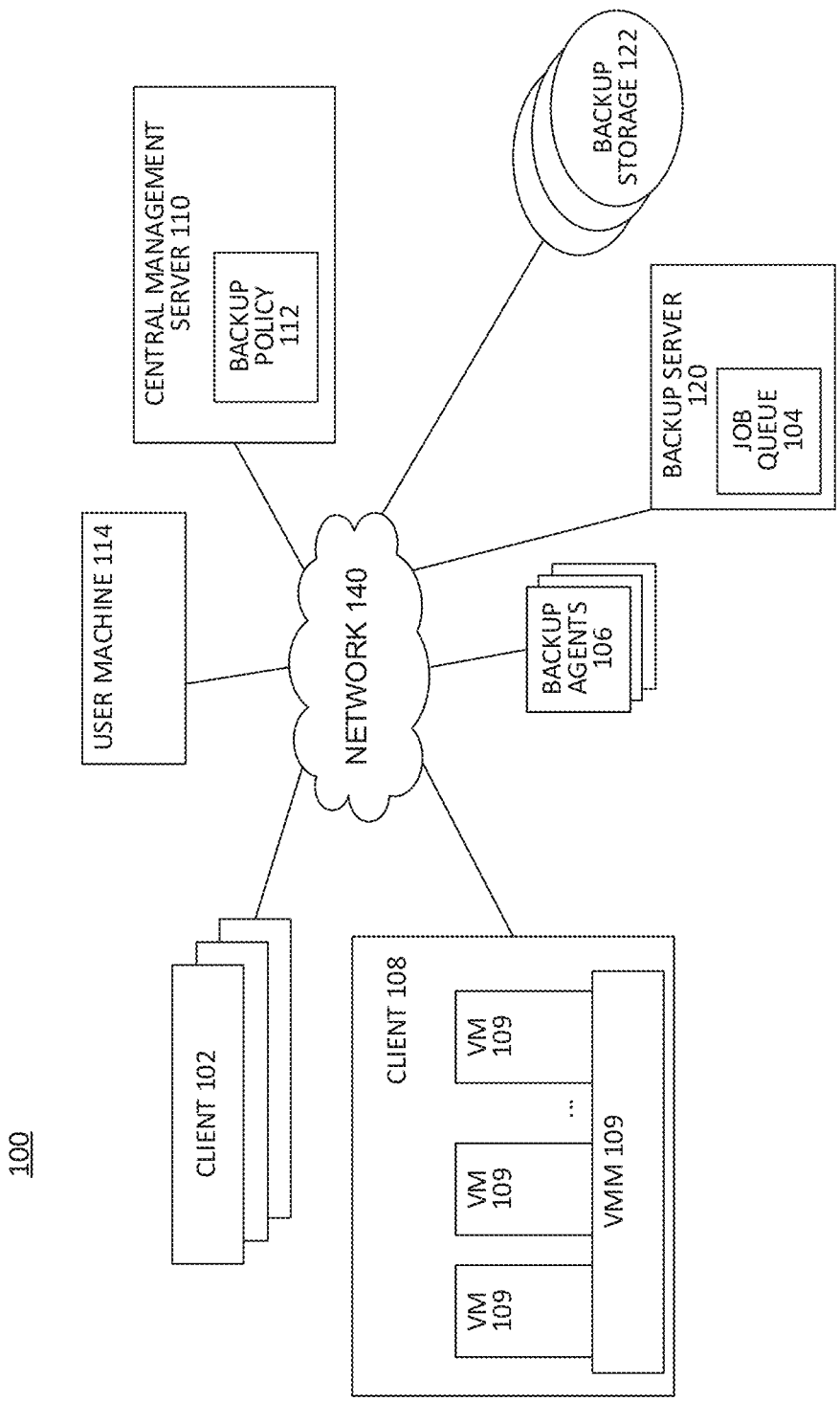
FIG. 1 is a block diagram illustrating clients that are supported by a backup server according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, scaling of agents can be determined based on a plurality of prediction algorithms. For example, the plurality of prediction algorithms can include a first prediction algorithm and a second prediction algorithm. Machine learning (ML) models of each of the prediction algorithms can be trained with previously performed backup jobs data. These machine learning algorithms can be tested with the training data to determine which algorithm is better at predicting execution time of each backup job.

The best algorithm (e.g., the algorithm with the lowest error) can be applied to a current number of backup jobs to dynamically predict a total backup execution duration for that number of backup jobs. This total backup execution duration and current number of backup jobs can then be used to predict an optimal or improved number of backup agents to deploy. The system can then scale-out or scale-in deployment of agents, based on this prediction.

An ML model can be a computer managed mathematical representation of a system or process that exists in the real world. Different ML models can represent the same system/processes differently (e.g., with different mathematical expressions and relationships). An ML model is generated (trained) by training a machine learning algorithm with training data. A machine learning algorithm is hypothesis set (a raw mathematical representation) that has not been trained with real-world data.

Training an ML model can include applying an ML algorithm to training data. The algorithm finds patterns in the training data such that input parameters to the algorithm correspond to the target training data. As a result of this training process, a trained machine learning model can be used (applied to new data) to make predictions. Training a machine learning model can result in defined values (also known as coefficients) that define the model.

For example, linear regression algorithm is a technique to fit a line (e.g., y=m x+c) to points (e.g., defined by training data). After fitting, the model can be expressed as y=33x+78. This a model where coefficients are 33 and 78. Generally, a model is something to that receives an input (data) and gives an output (e.g., a prediction).

Features are independent variables present in data (e.g., asset type, backup size, start time, backup target location, etc.) that can influence how the overall system behaves (e.g., how long a backup job will take). Prediction models use features to make predictions. More simply, one column of data can be thought of as a feature.

Referring now to FIG. 1, a networked system 100 is shown according to one embodiment. One or more clients 102 can manage files, databases, or other digital assets that require backup. A client 108 can host and manage one or more guest virtual machines (VMs) 109. Each of these VMs may also require backup.

A backup server 120 can service each of clients 102 and 108 by backing up each asset (e.g., a database, files, application data, a snapshot of a VM, etc.). Backup of each asset is considered a 'backup job'. A job queue 104 can be utilized to manage multiple backup jobs. Backup agents 106 (also known as backup proxies) are software components that are deployed to perform backup and restore operations.

The backup agents can retrieve and/or copy the digital assets being backed up, and manage transport of this data to backup storage 122 or to the backup server 120 which will then store this data to backup storage 122. Backup agents can be deployed (installed) as software components in each client, thereby utilizing capabilities of each client to manage the copy and transport of data to backup storage.

For clients that require backup of virtual VMs, the backup agents can optionally be deployed in the client 108 as a backup proxy VM. This is a VM that exists to perform backup tasks. Once deployed (installed as a proxy VM or other service), the agent can then process backup jobs by retrieving the VM data from production storage and transporting the VM data to backup server 120 to be stored in backup storage 122.

A central management server 110 can communicate with the different clients, thereby providing a centralized point that can manage the clients, and VMs that are hosted on each client. A user can log into a CMS and configure a backup policy 112 which determines how many backup jobs there will be. For example, the user can specify a time period (e.g., once a day) and a recurrence rate (e.g., twice in the time period) that backups shall occur for a given asset. Thus, the backup policy can have the total number of backup jobs (defined by a user), or this number can be calculated based on the backup policy.

A backup server 120 can communicate with a CMS to schedule backups of clients and target VMs. For example, the backup server can retrieve backup policy data or other data that indicates which assets are to be backed up, and when and how often each backup is to be performed. The clients, backup server, storage, and CMS can communicate over a network 140.

The clients 102 or 108 can be a server, a personal computer (e.g., desktops, laptops, and tablets), a "thin" client, a personal digital assistant (PDA), a Web enabled appliance, or a mobile phone (e.g., Smartphone), or a primary storage system (e.g., local data center) that provides storage to other local clients. Network 140 may be any type of networks such as a local area network (LAN), a wide area network (WAN) such as the Internet, a fiber network, a storage network, or a combination thereof, wired or wireless.

Backup storage system 120 may include or represent any type of servers or a cluster of one or more servers (e.g., cloud servers). For example, backup storage system 120 may be a storage server used for various purposes, such as to provide multiple users or client systems with access to shared data and/or to back up (or restore) data (e.g., mission critical data). Backup storage system 120 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Backup storage system 120 may further provide storage services via an object-based protocol and Hadoop distributed file system (HDFS) protocol.

A virtual machine represents a completely isolated operating environment with a dedicated set of virtual resources associated with it. A virtual machine may be installed or launched as a guest operating system (OS) hosted by a host OS or a hypervisor. Typically, a host OS or hypervisor represents a virtual machine monitor (VMM) for managing the hosted virtual machines. A virtual machine can be any type of virtual machines, such as, for example, hardware emulation, full virtualization, para-virtualization, and operating system-level virtualization virtual machines. Here VMM 136 manages the VMs.

Figure 2:
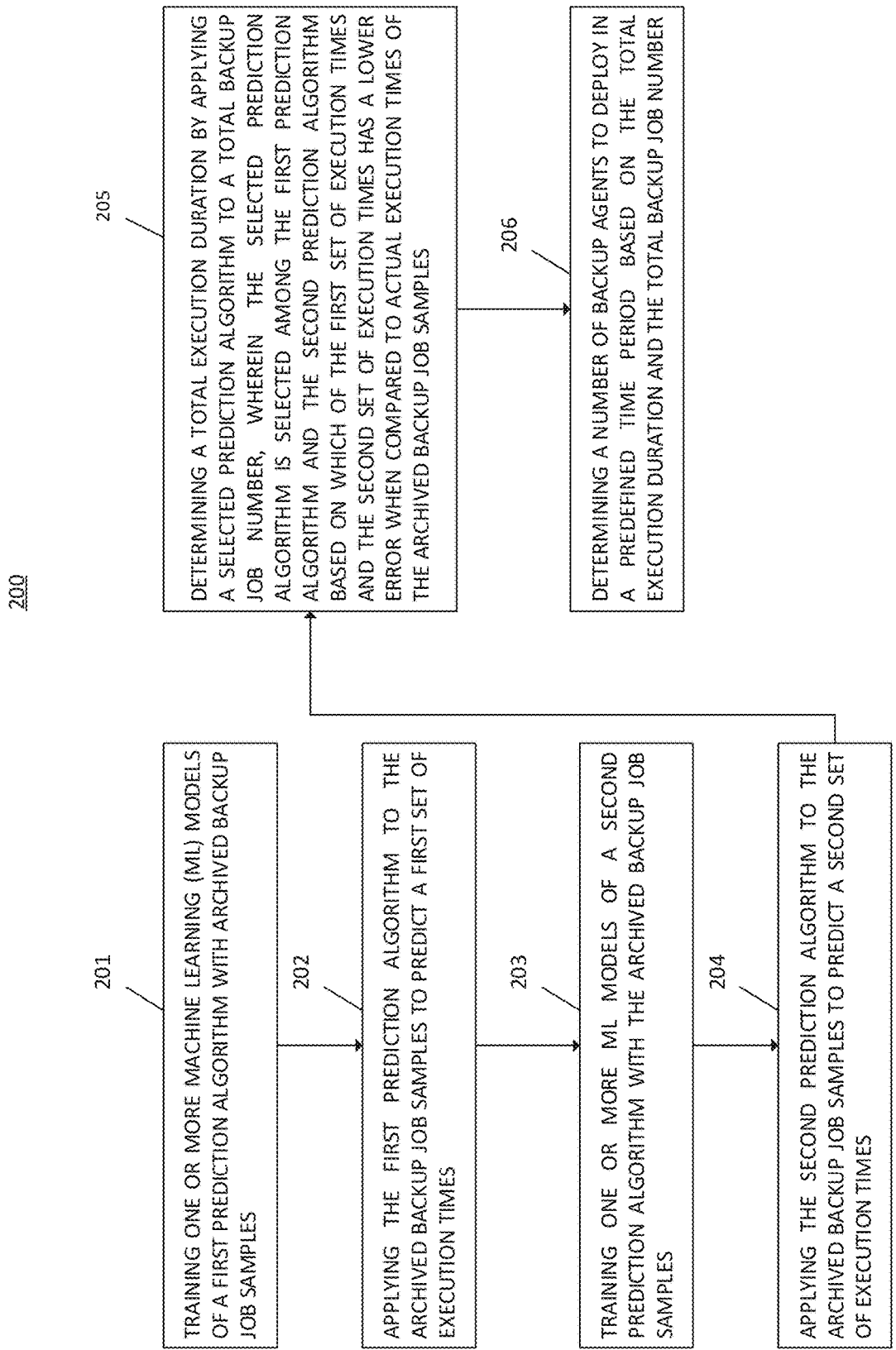
FIG. 2 is a sequence diagram illustrating a process to perform backup to one embodiment.

Referring now to FIG. 2, in one embodiment, a method 200 is shown for scaling backup agents. At operation 201, the method includes training one or more machine learning (ML) models of a first prediction algorithm with archived backup job samples. In some embodiments these archived backup job samples can be logged at the client where the backup is performed. In some embodiments, each backup agent can store the data to a common database (e.g., a file). The data can be managed by a client, the CMS, the backup server, or other networked computing device.

At operation 202, the method includes applying the first prediction algorithm to the archived backup job samples to predict a first set of execution times. This set of execution times includes a predicted execution duration for each job sample. The trained ML models of the first prediction algorithm take the archived backup job samples as input and then outputs a predicted execution time (how long it takes for a system to execute a backup) for each backup job sample in the archived backup job samples.

At operation 203, the method includes training one or more ML models of a second prediction algorithm with the archived backup job samples. This second prediction algorithm can include a different algorithm (and different ML models) from the first prediction algorithm, so as to yield a different (and potentially lower) error from the same data. In this manner the system can select among different prediction models based on performance.

At operation 204, the method includes applying the second prediction algorithm to the archived backup job samples to predict a second set of execution times that contains a predicted execution duration for each job sample. As a result, the method yields a predicted set of execution times based on different prediction models. These can be compared at operation 205.

At operation 205, the method includes determining a total execution duration by applying a selected prediction algorithm to a total backup job number, wherein the selected prediction algorithm is selected among the first prediction algorithm and the second prediction algorithm based on which of the first set of execution times and the second set of execution times has a lower error when compared to actual execution times of the archived backup job samples. In some embodiments, the error of each model is a measure of variance. Variance can be calculated as the average of the squared difference between each of the predicted execution durations and each of the actual execution times (from the archived backup job data). The error can additionally or alternatively include a measure of standard deviation between the predicted execution durations and each of the actual execution times. The variance and/or standard deviation measures how much each set of execution times differs from the actual execution times of the archived backup job samples on average.

At operation 206, the method includes determining a number of backup agents to deploy in a predefined time period based on the total execution duration and the total backup job number. The total execution duration can be determined by applying the selected prediction model to the total backup job number, yielding an execution duration for each hypothetical job of the total backup job number. The total execution duration can be a sum of each of those execution durations. The total backup job number can be determined by a backup policy, which can be configurable. The system can then scale out or scale in the number of agents to be deployed in the system, based on the determined number of backup agents.

In one embodiment, the one or more ML models of the first prediction algorithm includes a clustering model, and the one or more ML models of the second prediction algorithm does not include a clustering model. Clustering refers to a technique or method of finding subgroups within observations. Clustering is useful in finding structure in the data. Clustering is a type of unsupervised machine learning which aims to discover groupings in data such that each grouping contains objects (e.g., job samples) that are more similar to each other than to other objects (e.g., other job samples). Although clustering is an unsupervised learning technique, it can be used to cluster objects so that those clusters can then be used with supervised learning (e.g., linear regression).

The method 200 can be repeated automatically (e.g., without human intervention) periodically. The archived backup job samples can be continuously updated with performed backup job data each time the method is repeated. The ML models continue to be trained with each repetition of the method based on updated backup job data, to hone the one or more ML models of the first prediction algorithm and the one or more ML models of the second prediction algorithm. The method, including the training of the models described in the present disclosure, can be performed automatically by the system, e.g., without human intervention.

Figure 3:
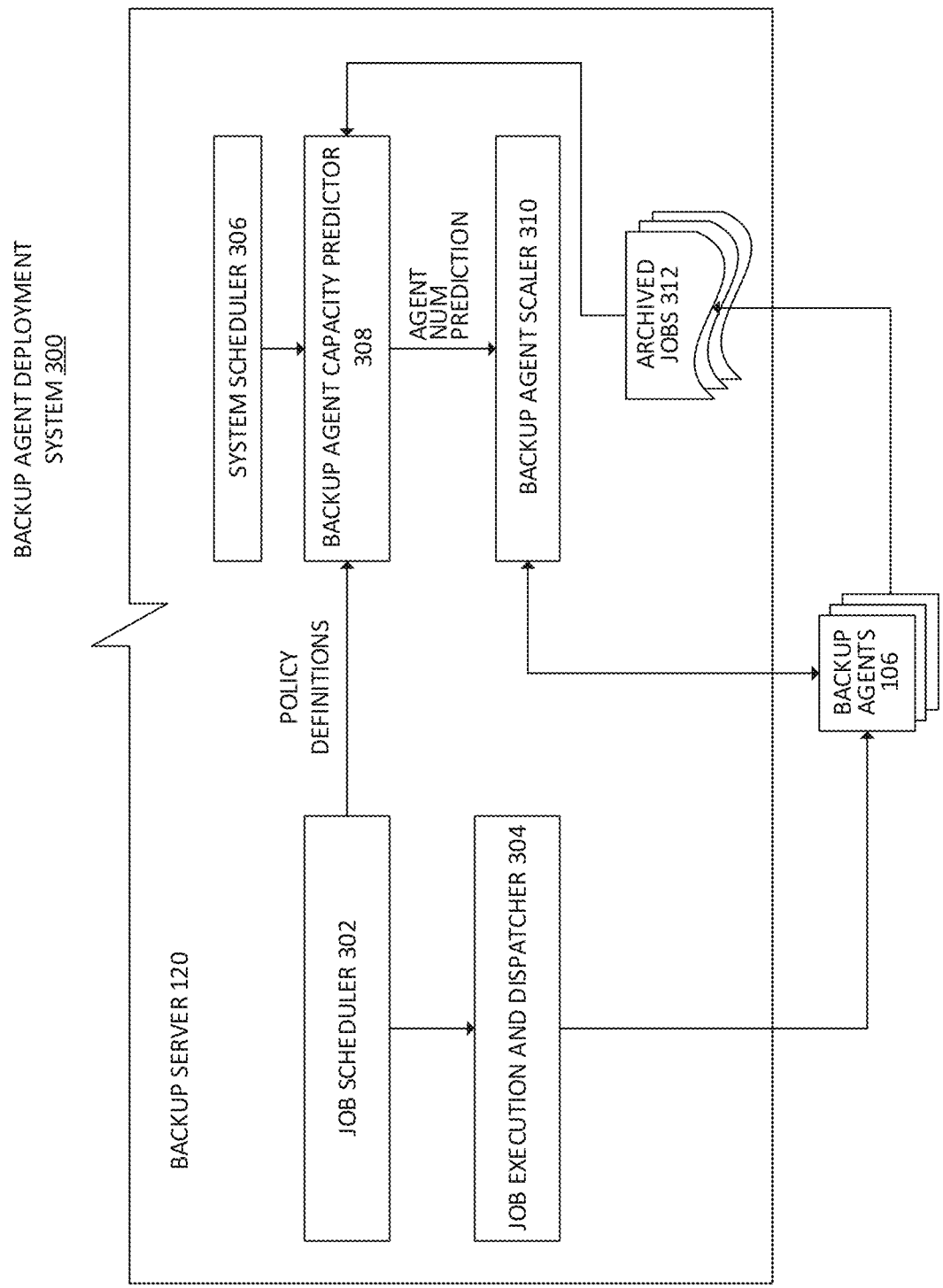
FIG. 3 is a block diagram illustrating a backup server having backup scaling according to one embodiment.

FIG. 3 shows a backup agent deployment system 300 according to some embodiments. It should be understood that, although the modules are shown as being integral to the backup server, these modules can, in other embodiments, be integrated in other networked devices either together or separately, for example, in the CMS, client, and/or other dedicated machines.

A system scheduler module 306 triggers a backup agent capacity predictor 308 to generate an agent number prediction. This trigger can be performed automatically at fixed intervals based on settings of the system scheduler which can be configured by a user.

The backup agent capacity predictor 308 can determine the work orders (backup jobs) to be executed within the next backup time interval, by analyzing the policy definitions of a backup policy from job scheduler module 302. The backup agent capacity predictor will predict the execution duration for each work order based on archived jobs data 312. As discussed in the other sections, the backup agent capacity predictor uses a 'bag of models' approach to predict the execution duration of each backup job.

Based on the number of currently deployed backup agents 106, a backup jobs success ratio of the last interval (or other prior intervals) and a total execution duration of the combined backup jobs from the corresponding interval, the backup agent capacity predictor will determine an optimal number of required agents in the next interval. The success ratio can be extracted from the archived jobs 312, where each logged backup job sample is associated with a success indicator that indicates whether that backup job completed successfully within the time interval. The backup agent capacity predictor (which includes multiple algorithms and machine learning models) is further described in other sections with reference to FIG. 4.

Backup agent scaler 310 will scale-out (increase) or scale-in (decrease) the number of deployed backup agents 106 based on the optimal number of required agents determined by predictor component. For example, if the current number of deployed agents is 25 and the predictor determines that 32 backup agents are optimal for the current interval and number of backup jobs to be performed, the backup agent scaler will deploy seven additional backup agents to the client or clients. As discussed, deployment of agents can include installing or activating a backup proxy or other software module to perform backup tasks. If, however, the predictor determines that 15 backup agents are optimal, then the backup agent scaler can reduce the number of backup agents deployed by 10. The backup agents can be scaled in by being deactivated or uninstalled at the client, thereby freeing client resources.

Figure 4:
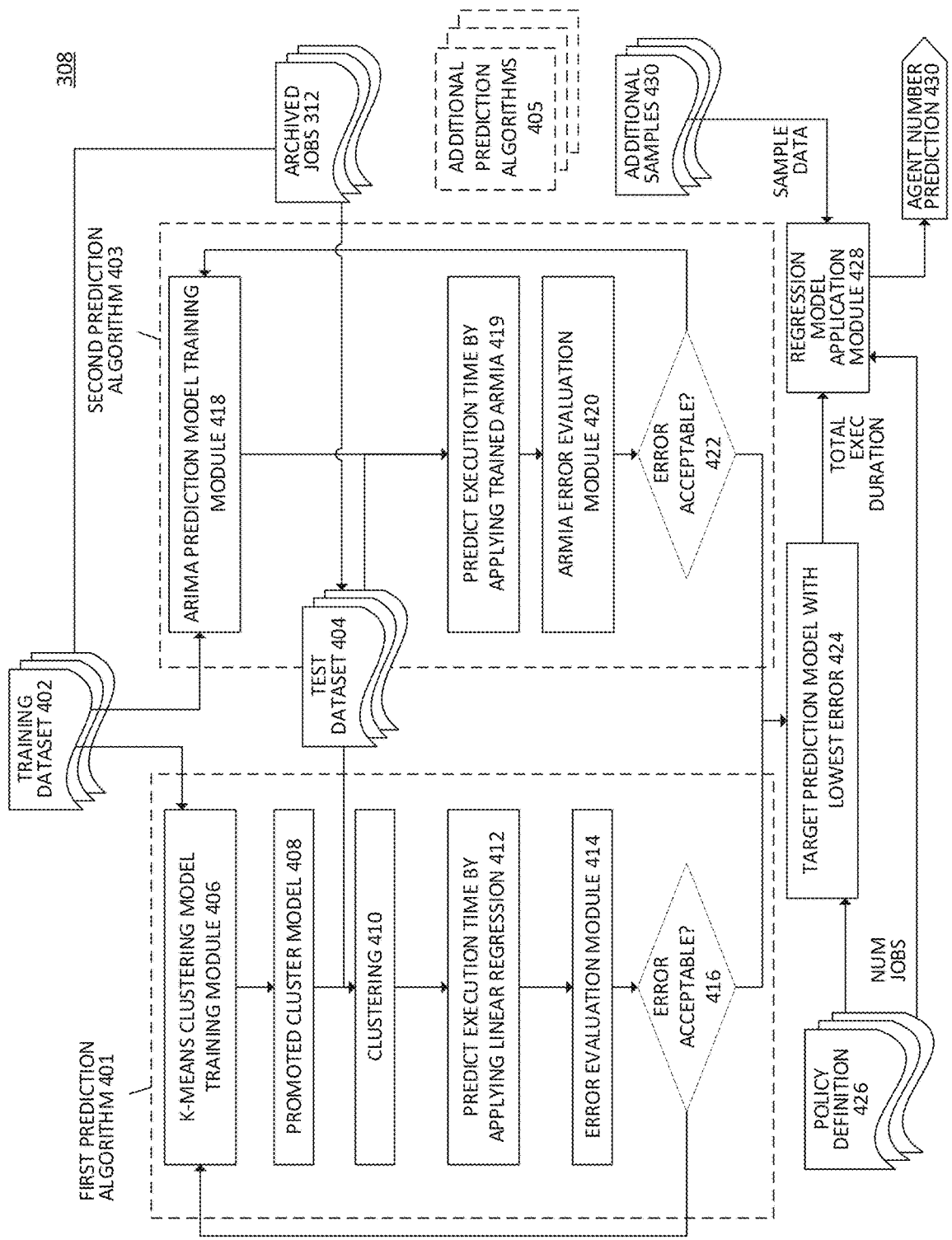
FIG. 4 is a block diagram illustrating a backup agent capacity predictor according to one embodiment.

Referring to FIG. 4, a backup agent capacity predictor 308 is shown, according to one embodiment. The backup agent capacity predictor implements a plurality of prediction algorithms (such as first prediction algorithm 401, second prediction algorithm 403, and, optionally, additional prediction algorithms 405), where each prediction algorithm includes one or more trainable machine learning models. The models are trained with archived backup job data 312. The trained models are then applied to the backup job data to compare performance. The prediction algorithm that has the lowest error 424 is then used to predict a total execution duration. In one embodiment, this archived backup job data is logged during backup of the same clients that current backup jobs are to be performed upon, so that the archived backup jobs data 312 accurately represent the environment (and possible changes) of the backup agent capacity predictor. Thus, the ML models can continue to be trained with the updated data, thereby potentially improving accuracy of the predictions.

A backup job execution duration is influenced by numerous factors and variations inherent in a client, backup server and target storage domains. Based on observation and analysis of archived backup job data, some data variables are found to influence backup job execution duration, and thus are treated as machine learning features. Such features can include, for example: asset type, Job start time, Target storage, Backup size, and Backup recurrence.

Analysis of the archived backup jobs also found that the execution duration distribution range for some assets are relatively static in certain environments. This static execution duration distribution range tends to occur in a stable environment where the assets to be backup are relative static, and backup policies are relative static. In most cases, however, assets in a customer environment tend to be a mix and backup policy tends to change overtime. For example, in some time periods, an asset mix and policy definition might be static (unchanged), but then in other time periods the asset mix and policy definition can change, especially when a dynamic policy (a policy that is configured to change overtime) is implemented.

Figure 5:
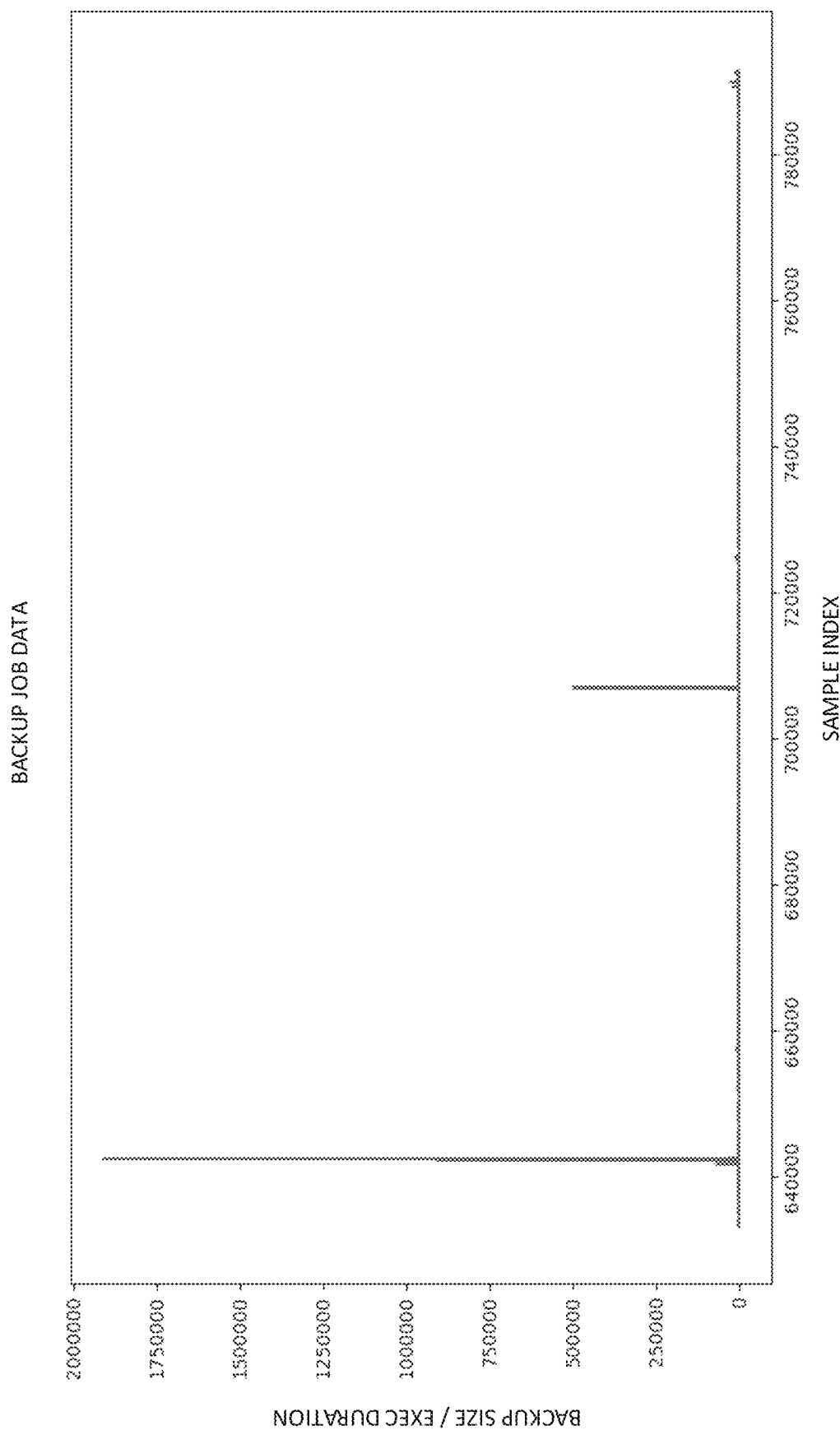
FIG. 5 shows a graph of backup data.

Analysis of the archived job data shows the difficulty of predicting execution duration for a new job. For example, FIG. 5 shows a plot of backup job data. The Y axis shows a ratio of backup size and execution duration (backup size/execution duration) per backup job. This ratio accounts for different backup sizes and allows backups of different sizes to be compared against each other meaningfully. The x-axis shows an index of each job sample. The plot shows that some jobs, independent of backup size, take much longer than other jobs. The mean backup size/execution duration value here is 113, and the standard deviation is 5506. Due to this high standard deviation and variance, it is difficult to fit a regression model to this data.

Referring back to FIG. 4, the first prediction algorithm 401 uses a clustering algorithm to cluster the backup job samples based on features. The features can include asset type, scheduled start time, backup size, backup recurrence and/or target storage. For example, prior to clustering, the training dataset can be arranged as follows:

TABLE 1

| Sample index | Asset Type | Job Start Time | Target storage | Backup size | Backup recurrence |
|---|---|---|---|---|---|
| 1 | 1 | 102 | 1 | 350.5 | 1 |
| 2 | 1 | 106 | 2 | 230.4 | 2 |
| 3 | 2 | 110 | 1 | 100.0 | 3 |

Different asset types can include, for example, Oracle, SQL, VM, and so on. In other words, it is an indicator of the type of asset (having a particular data structure) that is going to be backed up. These asset types can be represented symbolically (e.g., each can have an enumerated integer value). As discussed, clustering algorithms are unsupervised learning algorithms that groups data together(in this case, backup job samples) into clusters based on identified features. Clustering algorithms include K-Means, Hierarchical clustering, DBSCAN, and Gaussian Clustering Model.

Job start time can be an indicator of the time at which the backup job started. This can be, for example, an integer value representing minutes in a day, or other representation of ti me. Target storage indicates where the backup job is to be stored and can be a target storage index assigned by the backup system. Backup size is the size of the backup target (e.g., having a unit of MB). Backup recurrence describes how often the backup target should be backed up in backup time interval.

Once the archived backup job samples in the training dataset 402 are arranged with such features, a clustering algorithm can be implemented to train a clustering model and to cluster backup job samples into clusters of similar backup jobs.

Figure 6:
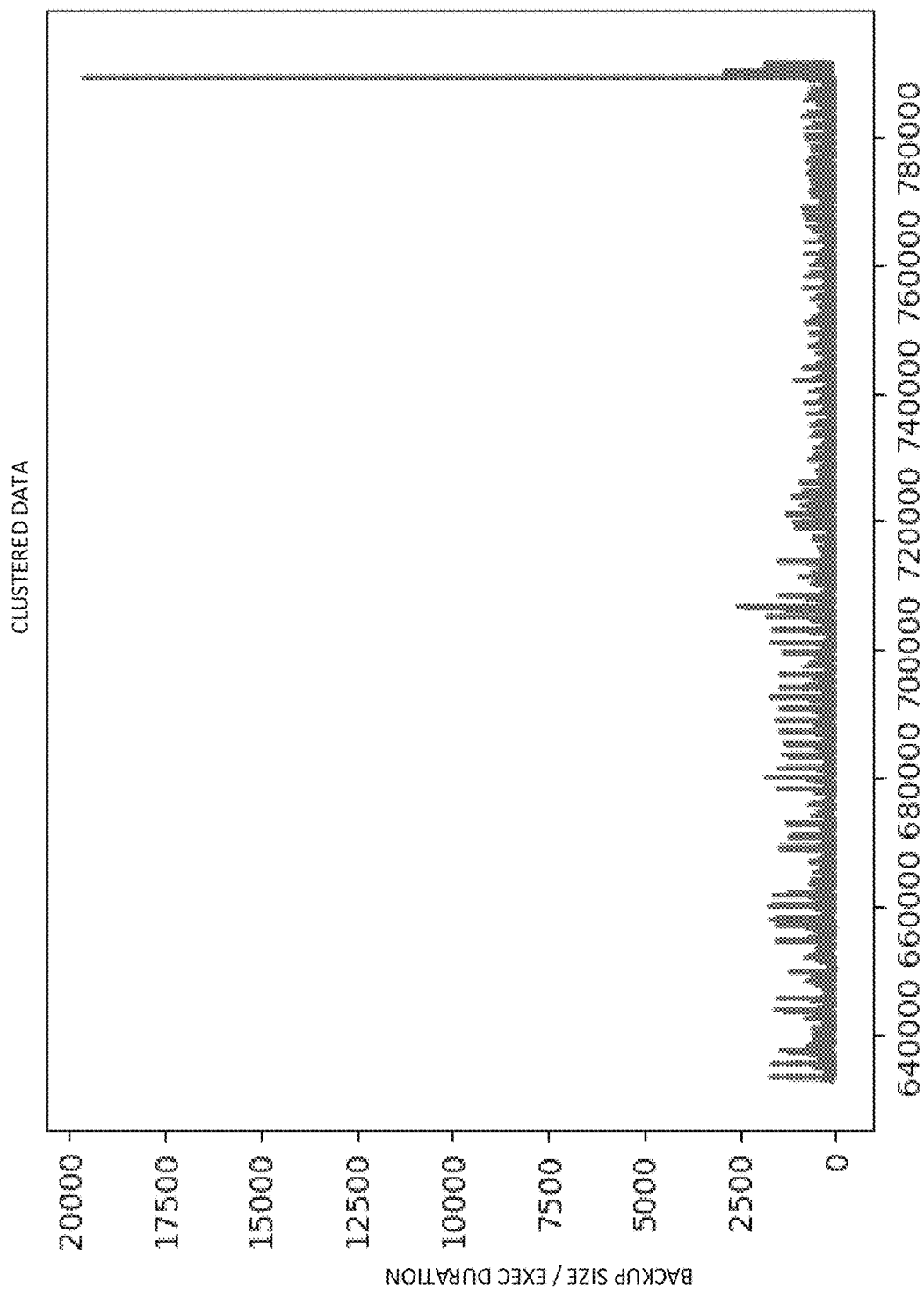
FIG. 6 and FIG. 7 show graphs of backup data with clustering.
Figure 7:
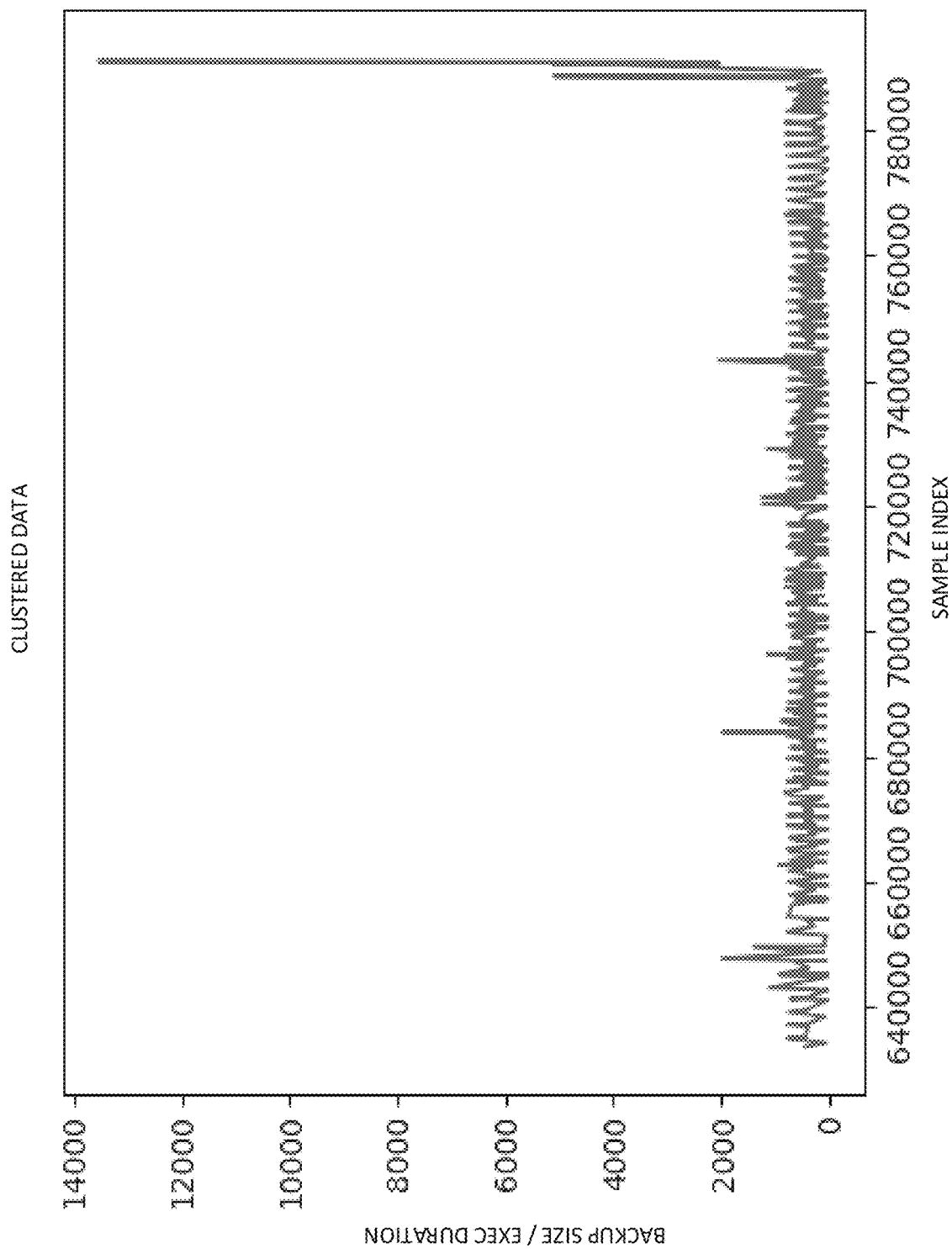

In some embodiments, the clustering algorithm used in the first prediction algorithm is a K-Means clustering algorithm. The K-Means model can be trained at block 406 by grouping the training dataset 402 into N clusters based on the features of the backup job samples. Referring to FIG. 6 and FIG. 7, a K-Means clustering algorithm separated the backup job samples into clusters with lower variance. In FIG. 6, the cluster of backup job samples had a mean backup size/execution duration value of 420 and a standard deviation of 238. In FIG. 7, a different cluster of backup job samples had a mean backup size/execution duration value of 157 and a standard deviation of 292. Thus, as shown by FIGS. 5-7, the value of "backup size/execution duration" is relatively concentrated on a range and clustering is able to reduce the variation between job samples (in a cluster).

Training of K-means cluster model can include repeatedly determining different the backup job sample clusters from a dataset. Each training repetition can result in a different K-Means model that yields different clusters of backup job samples. A promoted cluster model 408 is then applied to test dataset 404. The promoted or trained cluster model can be 'promoted' or selected based on which K-means cluster model yielded backup job samples with the best similarities (e.g., with lowest standard deviation and/or variance). After clustering is performed at operation 410, each of backup job samples in a respective cluster share similar features. In some embodiments, the clusters are filtered to only include successfully performed backup jobs. This can further train ML models to generate predictions that will ultimately yield successful backup jobs.

At operation 412, linear regression is applied on each of the filtered plurality of clusters to fit a linear regression model to each of the plurality of clusters, the fit of the linear regression model determining regression coefficients of the linear regression model. The best or optimal fit can be found, for example, by applying a least squares method or otherwise minimizing a cost function. A linear regression model can be determined for each cluster. Each cluster can be re-arranged as follows prior to fitting the linear regression model:

TABLE 2

| Sample index | Backup size | Execution duration |
|---|---|---|
| 1 | 350.5 | 550 |
| 2 | 230.4 | 463 |
| 3 | 100.0 | 200 |

Backup size is the size of the backup target (units can be in MB). Execution duration is the actual job duration time of archived backup jobs (units can be seconds). Thus, the fitted model can derive a relationship between backup size and execution duration for each cluster to be used for predictions.

Next, each trained linear regression model is applied to the clusters of the test dataset 404 (which have been clustered using the trained K-Means clustering model) to generate a predicted execution duration for each backup job.

At error evaluation module 414, an error (e.g., variance and/or standard deviation) of the first prediction algorithm is determined based on difference between the predicted execution durations and actual execution durations. If the error is beyond a threshold value then the models can be retrained and re-applied at modules 406, 408, 410, 412, and 416. The error threshold value can be defined in the system, for example, as a configurable setting or a hard-coded threshold. This threshold can be determined through routine experimentation and vary based on application.

The one or more ML models of the second prediction algorithm 403 can include an AutoRegressive Integrated Moving Average (ARIMA) model. Training can include arranging the archived backup jobs 312 into training dataset 402 so that each job sample includes a job scheduled timestamp and an execution duration as shown by the example:

TABLE 3

| Sample index | Job scheduled timestamp | Execution duration |
|---|---|---|
| 1 | 1565861668 | 550 |
| 2 | 1565862668 | 463 |
| 3 | 1565863668 | 200 |

Job scheduled timestamp can be the epoch second of the job scheduled start time for the specified backup job or other indication of the time when the job started. Execution Duration is the actual job execution duration of archived job (e.g. seconds). As mentioned, each backup job is a backup of a particular asset.

Training module 418 can train the ARIMA model with the training dataset 402. The auto regressive component of ARIMA indicates that the evolving variable of interest is regressed on its own lagged (i.e., prior) values. The moving average component indicates that a regression error is actually a linear combination of error terms whose values occur contemporaneously and at various times in the past. The integrated component indicates that the data values have been replaced with the difference between their values and the previous values (and this differencing process may have been performed more than once). The purpose of each of these features is to make the model fit the data as well as possible.

Non-seasonal ARIMA models can be denoted as ARIMA (p,d,q) where parameters p, d, and q are non-negative integers, p is the order (number of time lags) of the autoregressive model, d is the degree of differencing (the number of times the data have had past values subtracted), and q is the order of the moving-average model. Seasonal ARIMA models can be denoted ARIMA(p,d,q)(P,D,Q)m, where m refers to the number of periods in each season, and the uppercase P,D,Q refer to the autoregressive, differencing, and moving average terms for the seasonal part of the ARIMA model. The second prediction algorithm can implement a non-seasonal or seasonal ARIMA. The initialization parameters (p, d, q, P, D, Q and m) can be determined through routine test and vary depending on application. The ARIMA model can be fitted to the arranged backup job samples, thereby determining ARIMA coefficients of the model and training the model.

Figure 8:
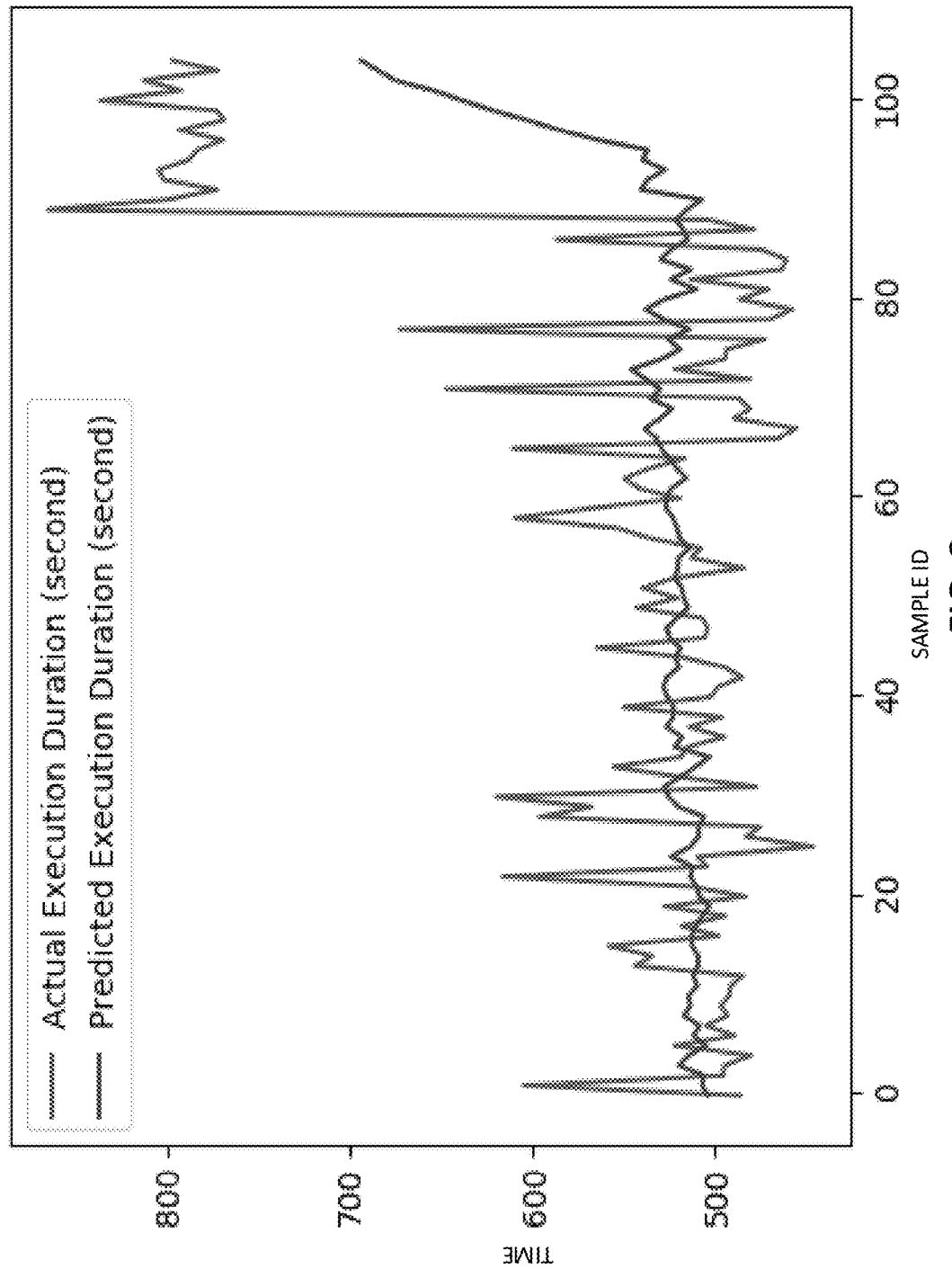
FIG. 8 shows predicted of execution duration of backups.

At ARIMA error evaluation module 419, the trained model can be applied to the data to predict an execution duration time of each archived backup job sample. FIG. 8 shows an example comparison between actual execution duration and predicted execution duration. In this example, the mean absolute error of the predicted execution durations is 61.7 seconds.

At error evaluation module 420, an error of the second prediction algorithm is determined in the same manner as described for error evaluation model 414. If the error is greater than an error threshold, then the algorithm (training and application of the ARIMA model) is repeated until the error is below the threshold. The error threshold at modules 420 and 414 can be the same. Thus, it is possible for both prediction algorithms to result in the same error (just better than the threshold). If this is the case, then either algorithm can be selected arbitrarily or randomly to be used for prediction.

Once the prediction algorithm with the lower error is selected, this selected prediction algorithm is applied at operation 424 to the number of backup jobs scheduled in the next backup time period, to determine execution duration of each of those backup jobs. These durations can be summed up to determine a total execution duration.

The backup agent capacity predictor 308 can then determine number of backup agents to deploy in the predefined time period based on the total execution duration determined at operation 424, and the total backup job number (which can be calculated based on the policy definition 426).

Additional data samples 430 can be collected from the running system or from a shared pool of samples uploaded by other customers. The data samples can be arranged such that each data sample includes a number of backup agents previously deployed in an associated backup, a total number of backup jobs required within time a slot, a total backup jobs execution duration, and a success ratio. Thus, the data samples can appear as such:

TABLE 4

| Sample index | Success Ratio | Agent Number | Job Number | Total backup jobs execution duration |
|---|---|---|---|---|
| 1 | 0.89 | 36 | 60 | 3200 |
| 2 | 0.92 | 40 | 70 | 2600 |
| 3 | 1.0 | 30 | 40 | 2500 |

Success Ratio is backup job success ratio that can be a ratio of the number of successful backup jobs performed in a time slot compared with the total number of backup jobs that were scheduled for that time slot. Agent Number is the number of backup agents working in parallel to perform the backup jobs in the time slot. Job Number is the total backup job number within a time slot. Total backup jobs execution duration is the sum of total backup job execution duration within a time slot.

The additional data samples can be filtered to include only data samples having above a threshold success ratio (for example, only a 1.0 success ratio). Regression model application module 428 can perform polynomial regression to fit a polynomial regression model to the additional data samples (as arranged and filtered), the fit determining coefficients of the polynomial regression model resulting in a trained model. The polynomial regression model is then applied to the total backup job number and the total execution duration to yield the number of backup agents to deploy in the predefined time period. This predicted number of backup agents is optimized to perform the backups in the current time slot with a success ratio that meets the threshold success ratio that the additional data samples were filtered at. When the threshold success ratio is 1.0 (100% success), then the predicted number of backup agents is tailored to perform the backups at 100% success, without over-deployment.

The agent number prediction 430 can then be provided to a backup agent scaler (as shown in FIG. 3) to increase or decrease the number of deployed backup agents in a system. Such a system provides a bag-of-models framework which includes multiple candidate models and algorithms to let the backup system adapt to different running environments. The system can determine the required agents by evaluating and learning from prior backup jobs instead of hard coding magic numbers. Such as system also mitigates against a high frequency of scaling operations.

Figure 9:
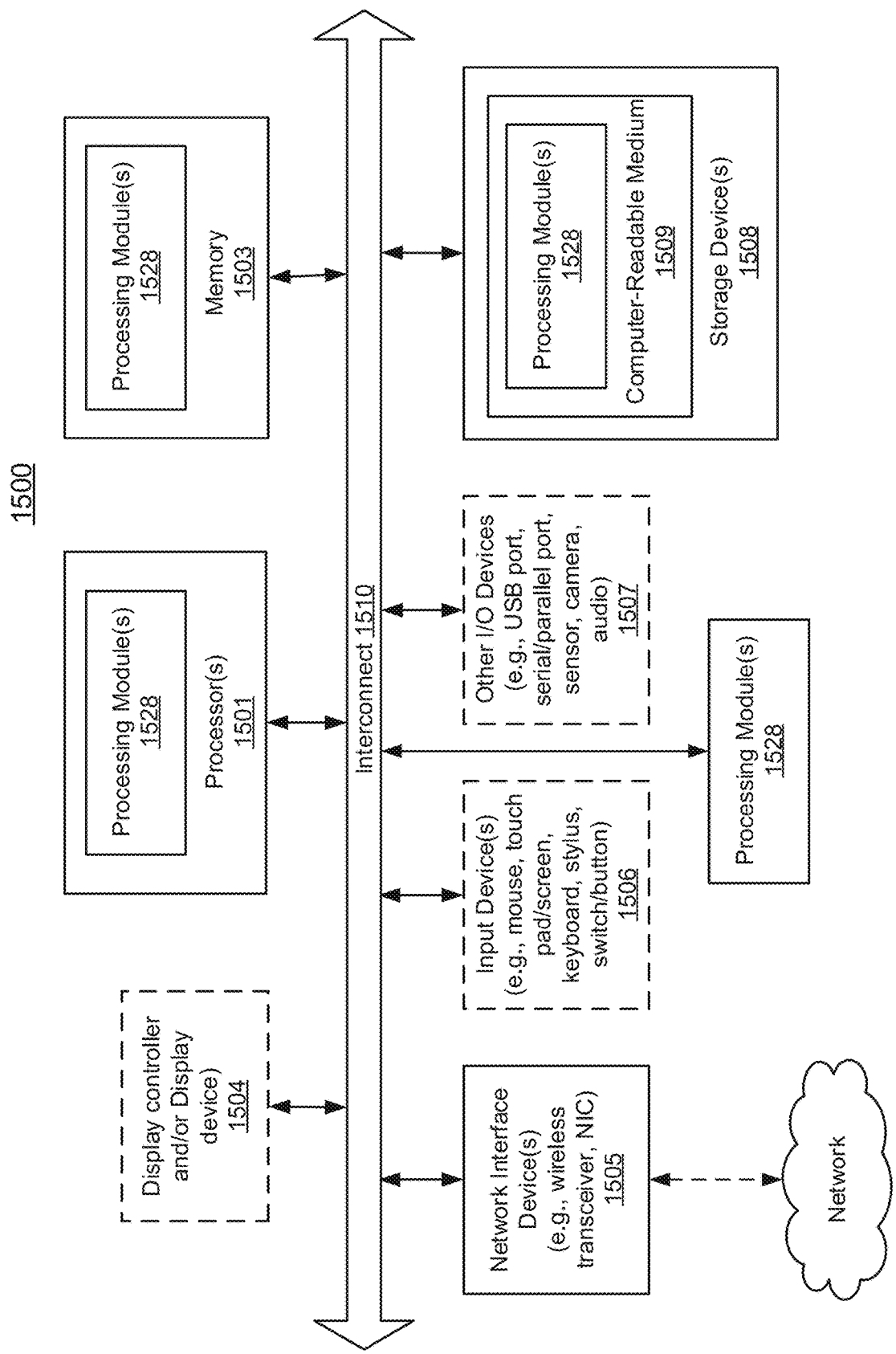
FIG. 9 is a block diagram illustrating a data processing system according to one embodiment.

FIG. 9 is a block diagram illustrating an example of a data processing system which may be used with one embodiment of the invention. For example, system 1500 may represent any of data processing systems such as the clients, CMS, user machine, and backup storage server shown in FIG. 1, for performing any of the processes or methods described in the present disclosure. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide fora given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a Wi-Fi transceiver, an infrared transceiver, a Bluetooth transceiver, a WiMAX transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller(not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including a basic input/output software (BIOS) as well as other firmware of the system.

Storage device 1508 may include computer-accessible storage medium 1509 (also known as a machine-readable storage medium or a computer-readable medium) on which is stored one or more sets of instructions or software (e.g., processing module, unit, and/or logic 1528) embodying any one or more of the methodologies or functions described herein. Processing module/unit/logic 1528 may represent any of the components described above, such as, for example, snapshot generation module 203, snapshot analyze module 205, a deduplication logic or a backup engine, as described above. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems which have fewer components or perhaps more components may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that includes hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein. In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for scaling backup agents to be deployed for performing backup of a target system, comprising:
training one or more machine learning (ML) models of a first prediction algorithm with archived backup job samples;
applying the first prediction algorithm to the archived backup job samples to predict a first set of execution times;
training one or more second ML models of a second prediction algorithm that is different from the first prediction algorithm, with the archived backup job samples;
applying the second prediction algorithm to the archived backup job samples to predict a second set of execution times;
determining a total execution duration by applying a selected prediction algorithm to a total backup job number, wherein the selected prediction algorithm is selected among the first prediction algorithm and the second prediction algorithm based on which of the first set of execution times and the second set of execution times has a lower error in comparison to actual execution times of the archived backup job samples; and
determining a number of backup agents to deploy in a predefined time period based on the total execution duration and the total backup job number.

2. The method of claim 1, wherein training the one or more ML models of the first prediction algorithm includes arranging the archived backup job samples so that each job sample has features including an asset type indicator, a job start time, a target storage indicator, a backup size, and a backup recurrence, and arranging the archived backup job samples into a plurality of clusters based on the features.

3. The method of claim 2, wherein arranging the archived backup job samples into the plurality of clusters is performed with a K-Means algorithm, thereby training a K-Means model.

4. The method of claim 3, wherein the plurality of clusters are filtered to only include successfully performed backup job samples.

5. The method of claim 4, wherein training the one or more ML models of the first prediction algorithm includes applying linear regression on each of the filtered plurality of clusters to fit a linear regression model to each of the plurality of clusters, the fit of the linear regression model determining regression coefficients of the linear regression model.

6. The method of claim 1, wherein training the one or more second ML models of the second prediction algorithm includes arranging the archived backup job samples so that each job sample includes a job scheduled timestamp and an execution duration.

7. The method of claim 6, wherein the one or more second ML models of the second prediction algorithm includes an autoregressive integrated moving average (ARIMA) model and training the ARIMA model includes fitting the ARIMA model to the arranged archived backup job samples, the fit of the ARIMA model determining ARIMA coefficients of the ARIMA model.

8. The method of claim 1, wherein determining the number of backup agents to deploy in the predefined time period based on the total execution duration and the total backup job number includes
arranging additional data samples, each data sample including a number of backup agents previously deployed in an associated backup, a total number of backup jobs required within time a slot, a total backup jobs execution duration, and a success ratio defined by a successful backup job number and the total number of backup jobs;
filtering the additional data samples to include only data samples having above a threshold success ratio;
applying polynomial regression to fit a polynomial regression model to the additional data samples, the fit determining coefficients of the polynomial regression model; and
applying the polynomial regression model to the total backup job number and the total execution duration to yield the number of backup agents to deploy in the predefined time period.

9. The method of claim 1, wherein the total backup job number is defined by or calculated from a backup policy.

10. The method of claim 1, wherein the lower error is determined based on which of the first set of execution times or the second set of execution times has a lower variance, each respective variance measuring how much each set of execution times differs from the actual execution times of the archived backup job samples on average.

11. The method of claim 1, wherein training the one or more ML models of the first prediction algorithm includes a clustering model, and the one or more ML models of the second prediction algorithm does not include a clustering model.

12. The method of claim 1, wherein the method is repeated automatically, and the archived backup job samples are continuously updated with performed backup job data each time to method is repeated, to hone the one or more ML models of the first prediction algorithm and the one or more ML models of the second prediction algorithm.

13. A non-transitory machine-readable medium having instructions stored therein, which when executed by a processor, cause the processor to perform operations, the operations comprising:
training one or more machine learning (ML) models of a first prediction algorithm with archived backup job samples;
applying the first prediction algorithm to the archived backup job samples to predict a first set of execution times;
training one or more second ML models of a second prediction algorithm that is different from the first prediction algorithm with the archived backup job samples;
applying the second prediction algorithm to the archived backup job samples to predict a second set of execution times;
determining a total execution duration by applying a selected prediction algorithm to a total backup job number, wherein the selected prediction algorithm is selected among the first prediction algorithm and the second prediction algorithm based on which of the first set of execution times and the second set of execution times has a lower error in comparison to actual execution times of the archived backup job samples; and
determining a number of backup agents to deploy in a predefined time period based on the total execution duration and the total backup job number.

14. The non-transitory machine-readable medium of claim 13, wherein training the one or more ML models of the first prediction algorithm includes
arranging the archived backup job samples so that each job sample has features including an asset type indicator, a job start time, a target storage indicator, a backup size, and a backup recurrence, and
arranging the archived backup job samples into a plurality of clusters based on the features.

15. The non-transitory machine-readable medium of claim 14, wherein arranging the archived backup job samples into the plurality of clusters is performed with a K-Means algorithm, thereby training a K-Means model.

16. The non-transitory machine-readable medium of claim 15, wherein the plurality of clusters are filtered to only include successfully performed backup job samples.

17. The non-transitory machine-readable medium of claim 16, wherein training the one or more ML models of the first prediction algorithm includes applying linear regression on each of the filtered plurality of clusters to fit a linear regression model to each of the plurality of clusters, the fit of the linear regression model determining regression coefficients of the linear regression model.

18. The non-transitory machine-readable medium of claim 13, wherein training the one or more second ML models of the second prediction algorithm includes arranging the archived backup job samples so that each job sample includes a job scheduled timestamp and an execution duration.

19. The non-transitory machine-readable medium of claim 18, wherein the one or more second ML models of the second prediction algorithm includes an autoregressive integrated moving average (ARIMA) model and training the ARIMA model includes fitting the ARIMA model to the arranged archived backup job samples, the fit of the ARIMA model determining ARIMA coefficients of the ARIMA model.

20. A data processing system including at least one hardware processor, the at least one hardware processor coupled to a memory programmed with executable instructions that, when executed by the at least one hardware processor, perform operations comprising:
training one or more machine learning (ML) models of a first prediction algorithm with archived backup job samples;
applying the first prediction algorithm to the archived backup job samples to predict a first set of execution times;
training one or more second ML models of a second prediction algorithm that is different from the first prediction algorithm, with the archived backup job samples;
applying the second prediction algorithm to the archived backup job samples to predict a second set of execution times;
determining a total execution duration by applying a selected prediction algorithm to a total backup job number, wherein the selected prediction algorithm is selected among the first prediction algorithm and the second prediction algorithm based on which of the first set of execution times and the second set of execution times has a lower error in comparison to actual execution times of the archived backup job samples; and
determining a number of backup agents to deploy in a predefined time period based on the total execution duration and the total backup job number.

* * * * *